United States Patent [19]
Schaffhausen

[11] Patent Number: 5,443,625
[45] Date of Patent: Aug. 22, 1995

[54] AIR FILTERING FIXTURE

[76] Inventor: John M. Schaffhausen, 8217 Nicollet Ave., Bloomington, Minn. 55420

[21] Appl. No.: 181,838

[22] Filed: Jan. 18, 1994

[51] Int. Cl.$^6$ .................................................. B01D 46/00
[52] U.S. Cl. ........................................ 95/273; 55/385.1; 55/470; 55/472; 55/481; 55/493
[58] Field of Search ............... 55/385.2, 470, 471, 55/472, 473, 481, 493, 385.1, 467, 501, DIG. 18, DIG. 36; 95/273

[56] References Cited

U.S. PATENT DOCUMENTS

| D. 287,888 | 1/1987 | Castor et al. . | |
|---|---|---|---|
| 2,790,510 | 4/1957 | Brabec | 55/385.1 |
| 3,075,335 | 1/1963 | Bandlow | 55/385.1 |
| 3,217,470 | 11/1965 | Omohundro | 55/470 X |
| 3,516,232 | 6/1970 | Gilbertson | 55/385.1 |
| 3,695,009 | 10/1972 | Osteen | 55/385.1 |
| 3,715,578 | 2/1973 | Wood et al. . | |
| 3,747,301 | 7/1973 | Glover et al. | 55/467 |
| 3,793,813 | 2/1974 | McAllister | 55/481 |
| 3,846,072 | 11/1974 | Patterson . | |
| 3,860,404 | 1/1975 | Jochimski | 55/385.1 |
| 3,890,126 | 6/1975 | Joseph . | |
| 4,088,463 | 5/1978 | Smith . | |
| 4,248,162 | 2/1981 | Skeist | 55/385.1 |
| 4,370,155 | 1/1983 | Armbruster | 55/472 X |
| 4,436,023 | 3/1984 | Takahashi . | |
| 4,612,909 | 9/1986 | Lee . | |
| 4,666,478 | 5/1987 | Boissinot et al. | 55/470 X |
| 4,737,173 | 4/1988 | Kudirka et al. | 55/470 X |
| 4,770,679 | 9/1988 | Slaughter | 55/385.1 |
| 4,790,863 | 12/1988 | Nobiraki et al. . | |
| 4,810,269 | 3/1989 | Stackhouse et al. | 55/471 X |
| 4,849,862 | 7/1989 | Diskin et al. . | |
| 4,926,293 | 5/1990 | Saba . | |
| 5,060,901 | 10/1991 | Lathrop et al. . | |
| 5,094,676 | 3/1992 | Karbacher | 55/385.1 |
| 5,141,539 | 8/1992 | Hiouani | 55/385.1 |
| 5,167,576 | 12/1992 | Hoek . | |

FOREIGN PATENT DOCUMENTS

| 597151 | 11/1925 | France | 55/385.1 |
|---|---|---|---|
| 8800812 | 10/1989 | Netherlands | 55/385.1 |
| 267334 | 6/1950 | Switzerland | 55/385.1 |
| 656553 | 7/1986 | Switzerland | 55/385.1 |
| 2186813 | 8/1987 | United Kingdom | 55/385.1 |

Primary Examiner—C. Scott Bushey
Attorney, Agent, or Firm—Robert C. Baker; Jeffrey A. Proehl

[57] ABSTRACT

The air filtering fixture is for suspension from the ceiling of a room to filter out unwanted tobacco smoke. The fixture has a housing formed of peripheral walls defining a generally vertical air path. The housing has an upper compartment portion and a lower flared hood portion. An air filter assembly is located within the upper compartment and a lighting assembly is situated within the hood portion below the filter assembly. At least one fan assembly is located above the filter assembly in the upper compartment. The fixture intakes air through a bottom opening in the flared hood portion and propels the air as an air stream upwardly out of a top opening in the upper compartment and toward the ceiling. A toroidal air movement about the housing is facilitated which induces unfiltered air laterally external to the housing to move downwardly from above the housing and enter the bottom opening to be filtered. An access opening in the housing permits easy filter replacement.

19 Claims, 2 Drawing Sheets

AIR FILTERING FIXTURE

BACKGROUND OF THE INVENTION

This invention relates generally to special purpose air filtering fixtures, and more particularly to room-type air filtering fixtures that promote recycling of air through them. The preferred air filtering fixtures of the invention include lighting means.

In public establishments, such as bars and restaurants, and also in private homes, it is often difficult to provide a comfortable and relatively smoke-free environment for smokers and non-smokers located in adjacent areas. Removing smoke-laden air from a room decreases the smoke concentration but it unfortunately also wastes the heating or cooling invested in the vented air. The effectiveness of a single air filtration device in a room generally decreases as the distance from the device increases, and provides uneven smoke removal within the room, with some air never subjected to filtration. Multiple ceiling air filtration devices are effective for more uniform air filtration, but together with separate lighting fixtures (and sometimes separate circulation fans) tend to clutter the ceiling area. Further, ceiling level devices which combine air filtration and lighting functions serve to filter the smoke-laden air only after it has risen to the ceiling, which permits the smoke to substantially diffuse into the air of the room and assault the senses of the room's occupants prior to filtration.

The problem thus has been to provide a useful air filtering fixture that not only is capable of intaking smoke-laden air close to the source of the smoke (i.e., a lit cigarette held in a person's hand), but also is capable of effectively causing filtration of smoke-laden air at elevated portions such as at the ceiling level. Heretofore known or suggested air filtering fixtures have not successfully solved this problem. Further, typical air filtering fixtures, especially those equipped with lighting means, have heretofore required disassembly of a significant portion of the fixture in order to change the air filter part. Such disassembly sometimes is difficult to accomplish when the fixture is in a mounted elevated condition of use. Disassembly of equipment portions (and the reassembly thereof after changing a filter) also imposes a significant and undesirable maintenance burden for the user.

SUMMARY OF THE INVENTION

The invention provides an air filtering fixture designed to intake smoke-laden air close to its source and also designed to facilitate movement of air about the fixture in a manner causing smoke that initially ascends without filtration by the fixture to be circulated downwardly from elevated levels (such as from the ceiling) and enter the fixture for filtration. The invention additionally provides for simplified air filter replacement that does not require disassembly of the fixture and that may easily be performed while the fixture is mounted in a use environment.

The new air filtering fixture is designed for mounting in spaced relationship from the ceiling of a room and in an elevated condition above an area where persons may congregate. The fixture comprises a housing having peripheral walls which define a generally vertical air path for an upwardly moving air stream. The housing has a bottom opening which defines an air intake mouth and a top opening which defines an air exhaust for directing air upwardly from the housing.

The new fixture has an air filter removably mounted in the interior of the housing. The filter extends transversely of the air path and functions to filter contaminants out of the air stream.

Air propulsion means is mounted above the air filter in the housing so as to pull air from below the housing upwardly through the air intake mouth and through the air filter and propel the air as an air stream out of the top opening of the housing toward the ceiling. The fixture facilitates a toroidal air movement about the peripheral walls of the housing, with air within the housing moving upwardly and air laterally external to the housing being induced by upwardly displaced air above the housing to move downwardly and enter or reenter the air intake mouth for filtration.

The ideal fixture has light emitting means mounted on the housing for projecting light downwardly therefrom. Structural means on the housing are preferably included for receiving suspension elements for mounting the fixture in suspended relationship from the ceiling. A special access opening in a peripheral wall of the housing is preferably included to permit removal and replacement of air filters. A closure means such as a hinged door is provided for the access opening. A support channel in the interior of the housing on the peripheral walls is provided for air filters. The most preferred air propulsion is by an axial flow fan. Other preferred features of the invention include an outward flaring of the peripheral walls near the bottom opening and light transmitting panels within the flared portions of the peripheral walls.

Additional features and benefits and advantages of the invention will become evident as this description proceeds.

DESCRIPTION OF THE PREFERRED EMBODIMENT

Figure 1:
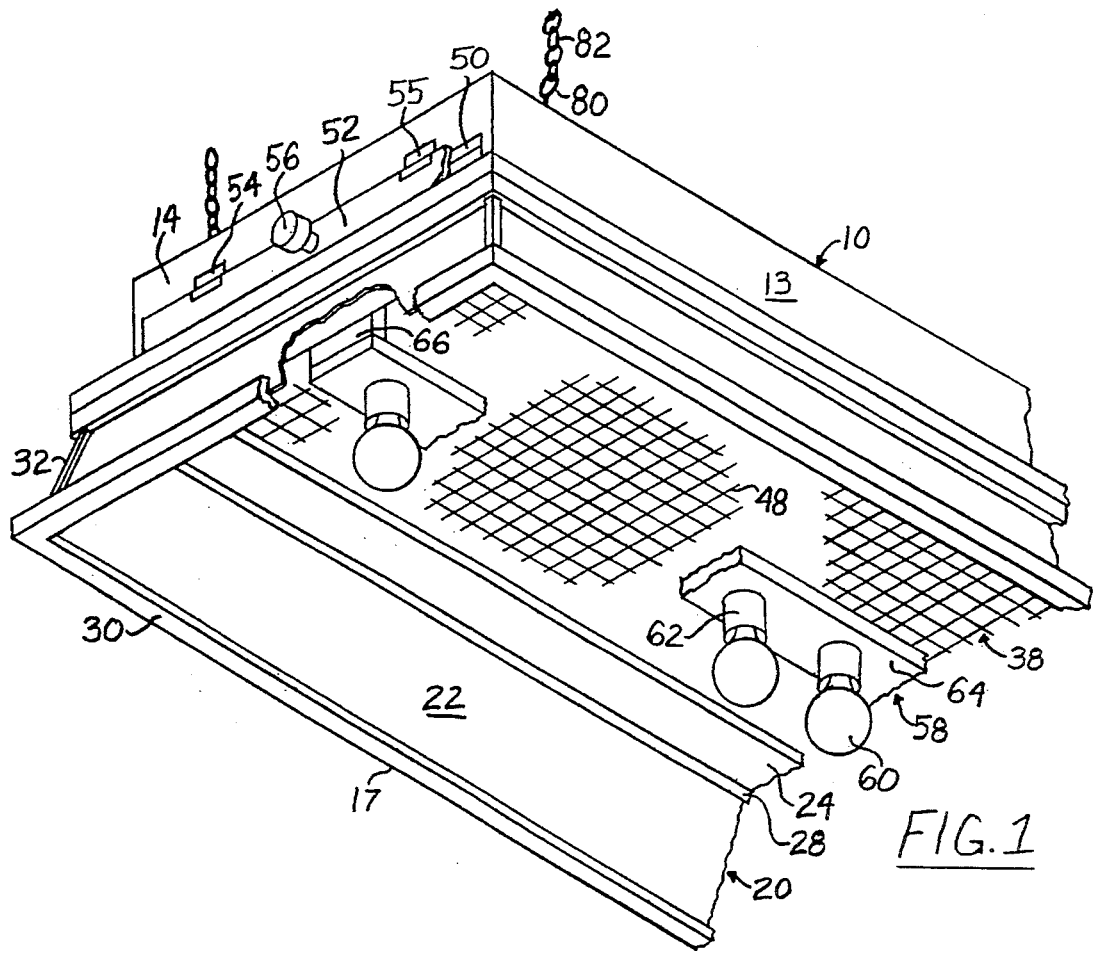
FIG. 1 is a schematic perspective view of the air filtering fixture of the-invention, with parts broken away.
Figure 2:
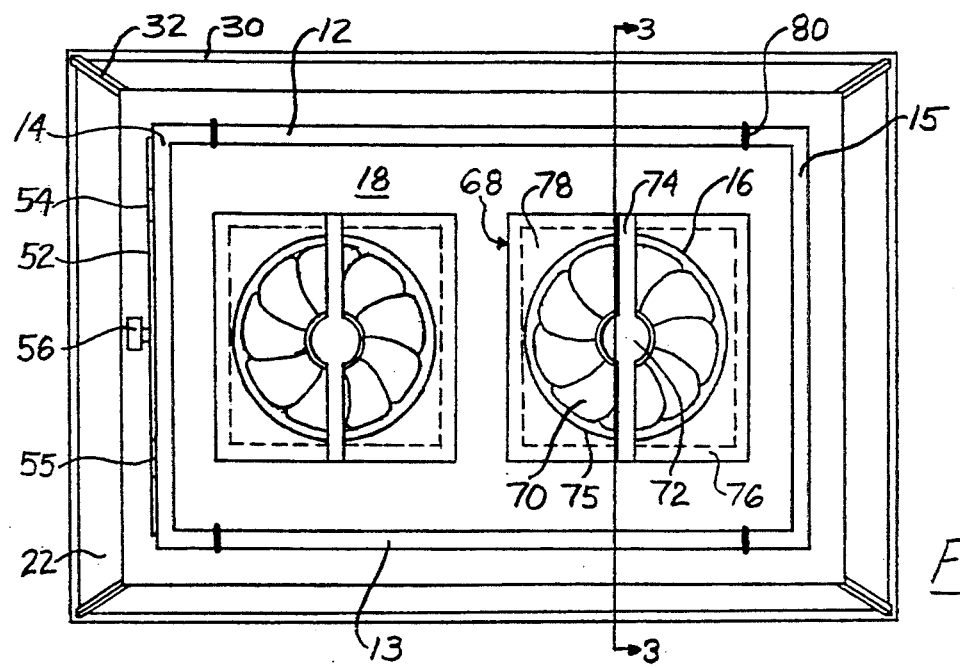
FIG. 2 is a schematic top plan view of the fixture of the invention.
Figure 3:
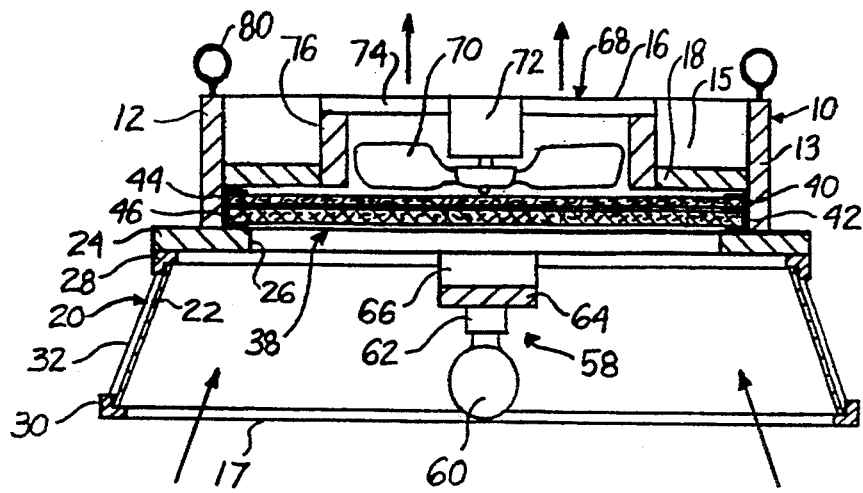
FIG. 3 is a schematic sectional view taken along line 3—3 of FIG. 2.

Referring to the FIGS. 1-3 of the drawing, the new air filtering fixture is generally comprised of a housing having an upper compartment 10 and a lower hood portion 20. An air filter assembly 38 is located within the upper compartment 10 and a lighting assembly 58, when used, is situated below the filter assembly 38, usually within the hood portion 20. At least one fan assembly 68 is located above the filter assembly 38 in the upper compartment 10.

The upper compartment 10 of the housing is suitably rectangular and formed by laterally spaced and substantially vertical peripheral side walls 12, 13 and end walls 14, 15 which define the lateral peripheral extent of the generally vertical air path through the housing at the upper compartment portion of it. Peripheral wall configurations other than rectangular may be useful, e.g., octagonal, circular and oval shapes. The peripheral walls of the housing have a bottom opening 17 which defines an air intake mouth and have a top opening 16 which defines an air exhaust for directing an exiting air stream upwardly from the housing. A horizontal blocking wall 18 has its peripheral edges fixed to the vertical peripheral walls. Blocking wall 18 supports the fan assembly 68 within the housing and also limits passage for the air stream so that it travels through the fans of the fan assembly 68 and then out the air exhaust 16.

The hood portion 20 of the housing is preferably comprised of peripheral hood walls 22 (suitably translucent or transparent) that create a flared effect by slanting downward and generally outward. The flaring tends to increase the size of the air intake mouth 17 over what it would be without the flaring and thus increases the area below the housing for air intake. A horizontal throat plate 24 is joined to the bottom edges of the vertical upper peripheral walls 12, 13, 14, 15 and has a central throat opening 26 that opens into the interior of the upper compartment 10. Mounted to the outer periphery of the throat plate 24 are L-shaped throat plate angle strips 28 which form a seat or mounting base for the upper edges of the peripheral hood walls 22. Fixed to the lower edges of the hood walls 22 are L-shaped rim angle strips 30 that form the outer edge or rim of the bottom opening 17. A corner member 32 at each corner of the hood portion 20 extends between the throat plate angle strip 28 and rim angle strip 30 to cover the joint between adjoining sections of the hood walls 22.

The air filter assembly 38 is removably mounted in the housing and extends transversely of the air path in order to intercept and remove smoke and other contaminants from the air stream moving upwardly through the interior of the housing. The filter assembly 38 is preferably located near the lower end of the upper compartment 10 near the throat plate 24 and covers the throat opening 26. The preferred filter assembly 38 has a primary filter 40 with a secondary filter 42 situated below (or optionally above) the primary filter 40. The filters 40, 42 may be separately removable cartridges or may be integrated into a single part for simultaneous replacement.

The primary air filter 40 is preferably comprised of a fibrous filter media or woven material that is capable of removing from the air stream the components (e.g., soot and tar) of cigarette smoke. One suitable filter is an accordion-folded filter material comprised of electrostatically-charged fibers, such as the Filtrete brand air filter available from the 3M Corp. of St. Paul, Minn. Other types of filters are also suitable, such as a high efficiency particulate air (HEPA) filter or an electrostatically-charged plate system. The secondary air filter 42 is preferably an activated charcoal-type filter for removing or neutralizing the odors of cigarette smoke, but could also be an additional particle-removing filter. A benefit of locating a dark colored (e.g., black charcoal) secondary filter below the primary filter in the housing is that the lower surface of the filter assembly will not easily become discolored by smoke and thus appear dirty to persons viewing the fixture from below.

The filters 40, 42 are supported horizontally within the interior of the upper compartment 10 by a generally U-shaped primary filter support channel 44 and a U-shaped secondary filter support channel 46, respectively, which are mounted to the interior sides of the peripheral walls 12, 13, 14 and 15 so that the channels on adjoining walls meet at the corners of the upper compartment 10. The channels 44, 46 may be separate, or may be integrated together as shown in FIG. 3. The support channels 44, 46 preferably fit relatively snugly against the outer peripheral edges of the installed filters 40, 42 to establish a substantially air tight relationship between those peripheral edges and the peripheral walls of the upper compartment 10. Other means may be used to prevent the air stream from passing around the edges of the filters. For example, an air tight relationship may be established by a gasket.

A support grid 48 (shown in FIG. 1) located adjacent to the bottom surface of the secondary filter 42 is a preferable, but not essential, feature which helps support the weight of the filters across the throat opening 26. The grid 48 may be integrated into a removable filter cartridge but optionally may be mounted to the throat plate 24 as a support structure.

A significant feature of the invention is the filter replacement access opening 50, shown in FIG. 1. The access opening 50 facilitates and simplifies the periodic removal and replacement of dirty air filters without disturbing the lighting assembly 58 or requiring other disassembly steps for the housing. Disassembly steps are not easily performed while an air filtering fixture is in a suspended condition for use. The access opening 50 is formed in one of the peripheral walls (e.g., end wall 14) of the upper compartment 10 so as to be in substantial alignment with the support channels 44, 46 inside the housing. This arrangement permits the filters 40, 42 to be easily slid out of the channels 44, 46 through the opening 50 for inspection and replacement.

An access door 52 is provided as a means for closing the opening 50 so as to obstruct or prevent air from moving through the access opening 50 when the fixture is in operation, and thereby causing loss of filtering function. The access door 52 is attached with hinges 54, 55 to the exterior of the peripheral end wall 14 to permit the door 52 to swing generally upward from a closed position over the opening 50 to an open position which allows the filters to slide out of the opening 50. A knob 56 is mounted to door 52 to permit easy pivoting or opening of the door. Preferably, an easily compressed gasket material (e.g., a foamed elastomer) is fixed to the interior-facing surface of the access door 52 to press against the peripheral edges of the filters when the door 52 is in a closed position, to thereby deter the air stream from bypassing the filters. A hinged door is not the only suitable means for closing the access opening 50. For example, a flat panel fixed to an edge of a filter cartridge could close or block the opening 50 upon insertion of the cartridge into the housing.

As shown in FIGS. 1 and 3, the lighting assembly 58 is a preferred feature of the invention and is mounted to the housing in a manner that permits the light emitted from the assembly 58 to be projected downwardly out of the bottom opening 17 to the area below the fixture. This assembly 58 is most suitably located within the hood portion 20 of the housing. In the most ideal embodiment, a series of incandescent light bulbs 60 provide a pleasing light for a bar or restaurant setting, but fluorescent, halogen, neon, or other types of light emitting devices are also useful. Each bulb 60 is installed in a bulb socket 62 which is mounted on a bridge member 64 that spans across the interior of the hood at a location below the throat opening 26 in the throat plate 24. Thus, the bridge member 64 serves as a mounting member for a lighting assembly or fixture; and the bridge is spaced below the surface of the secondary filter 42, and below filter 40 to reduce restriction of air flow into the filter assembly 38. The spacing is produced by a spacer member 66 fixed to the throat plate 24. Spacing the bridge for the lighting assembly 58 downwardly from the filters 40, 42 is a preferred feature of the invention, but if desired, the bridge member 64 or similar structure could be located in the plane of the filters 40, 42, with a portion of each filter lying on either side of the lighting assembly.

One or more fan assemblies are located in the housing above the air filters 40, 42 and provide the means for propelling an air stream upwardly through the housing. For example, the fan assembly 68 pulls air from below the housing upwardly through the air intake mouth of the flared hood portion 20 and through the air filters 40, 42. The air stream then flows through the fan assembly 68 and is propelled by the fan system as an air stream out of the top opening or exhaust 16 of the housing, in a direction towards the ceiling from which the fixture is suspended. The number of fan assemblies used in a particular fixture may be increased or decreased based upon the size of the fixture and the concentration of smoke to be removed.

Each fan assembly 68 includes axial fan propeller blades 70 suitably in a direct drive but optionally in an indirect or friction or belt drive relationship with a fan motor 72. The fan assembly is supported by a support member 74 inside a duct-like circular chamber wall 75 which is coaxial to the propeller 70 and which defines a portion of the vertical air path through the fixture. The fan support member 74 is mounted to an external vertical foundation wall 76 which in turn is mounted to the blocking wall 18. A horizontal fill wall 78 with a circular opening closes the gap between the chamber wall 75 and the foundation wall 76 to prevent air from passing around or outside the chamber wall 75. Although an axial type fan is preferred, other fan types such as centrifugal impellers or "squirrel cage" blowers may be utilized with the air exiting the fans being directed upwardly. Preferably the area of the top opening or air exhaust 16 is smaller than the area of the air intake mouth 17 to produce a relatively faster air stream at the exhaust than at the mouth. A ratio of intake area to exhaust area in the range of about 1.2:1 to 10:1 is suitable; and a ratio within about 1.5 or 2:1 up to 5:1 or 6:1 is most preferred.

Locating the fan assembly 68 after the air filter assembly 38 in the air path has several benefits. Most importantly, the fan assembly 68 of the fixture is able to generate a stronger upward air stream at the air exhaust 16 than if the air stream was required to flow through filter media after leaving the fan. A filter after a fan tends to dissipate the strength of an upward air movement above the housing. An additional benefit is that the media or body of the filters 40, 42 act as a noise buffer between the fan assembly 68 and the lower air intake mouth. They muffle the fan noise that may be heard by those persons who are seated near the bottom opening 17 of the housing. Also, filtering the smoke out of the air stream before it travels through the fan assembly 68 reduces the amount of airborne smoke and dirt that may come in contact with the fan assembly, which in turn reduces the amount of cleaning the fan assembly needs and reduces the possibility that dirt will adhere to the fan propeller 70 and cause it to become unbalanced and noisy.

A significant feature of the invention is the facilitation by the fixture of a toroidal or doughnut-shaped air movement about the peripheral walls of the housing. The toroidal air movement is facilitated by moving air from below the fixture upwardly as an air stream within the housing and then upwardly out the air exhaust toward the ceiling from which the fixture is suspended. The upwardly moving air in the air stream displaces the air occupying the space above the fixture and near the ceiling, inducing that air to move downwardly in areas laterally external to the housing to a level below the housing where the air can enter the air intake mouth. Also, an upwardly moving air stream can be effective to strike against a ceiling surface and splash or flow laterally outward in a direction generally parallel to the ceiling surface until the air runs into a wall or other obstruction in the room or into a similar air current induced by other fixtures of this invention that may be operating in the room. The air from the new fixture displaces air above the fixture and causes it to be deflected downwardly toward the area below the air intake mouth of the fixture.

The toroidal air movement facilitated by the fixture is effective for filtering smoke-laden air that has avoided being pulled into the air intake mouth of the fixture (after the initial emission from a cigarette). Such smoke-laden air may even ascend to the ceiling area above the intake of the suspended fixture. Rather than allowing the smoke-laden air at the ceiling to simply accumulate and concentrate because it is above the immediate reach of the air intake mouth, the toroidal air movement induces that air to move downwardly from the ceiling area to a level where it can be captured by the air intake mouth and filtered by the fixture.

The direction of the air stream upwards out of the air exhaust is additionally beneficial in that the fan noise is also directed harmlessly toward the ceiling where it is less perceptible to persons below the fixture.

To achieve maximum smoke filtering effectiveness, the air filtering light fixture of the invention is most preferably suspended in spaced relationship from the ceiling of a room and in an elevated condition above but nevertheless proximate to (or not high above) an area where persons are likely to congregate or remain relatively stationary for a period of time and smoke tobacco products. The fixture is useful above a dining table or bar or game table (e.g., a pool table), etc. Multiple fixtures are preferably installed in a particular room to obtain the most uniform air filtration. Structural means 80 are provided on the housing which are adapted to receive or be attached to suspension means 82 (e.g., a flexible chain or rope or strap or other means) which mount the fixture in a suspended relationship from the ceiling of a room at a desired location. The preferred embodiment features eye bolts 80 that are mounted to the housing at the ends of the peripheral side walls 12, 13. The eye bolts 80 are capable of receiving a hook or link of a chain 82 that is attached to the ceiling in a conventional manner for supporting the weight of the suspended fixture.

The walls of the upper compartment, the throat plate and the various angle strips and corners may be constructed of any suitably strong material, such as wood or plastic (e.g., a nylon or polycarbonate) or metal or any combination thereof. Wood (e.g., oak, pine, and others) is a desirable material and may be stained or otherwise decorated to present an attractive fixture exterior appearance. Wood will also generally absorb noise generated by the fixture better than, for example, metal panels. The peripheral hood walls 22 are preferably constructed of a transparent or translucent material such as glass or a plastic (e.g., polymethyl methacrylate, plexiglas, etc.), although metal or wood parts may be employed.

A power switch (not shown) may optionally be installed on the fixture (e.g., on blocking wall 18) to permit the interruption of electrical power to the fixture during filter replacement or other maintenance. Energy conservation is another desirable feature. Energy conservation can come from installing a detection device for monitoring the smoke concentration level in the air proximate to the fixture (preferably within the hood portion) and then switching the propulsion fans on and off in response to the smoke concentration level detected. Once the detection device detects that the smoke concentration has exceeded a threshold level, the fans are automatically turned on and air filtration is performed until the smoke concentration falls below the threshold level and the device then turns the fans off. The electrical wiring for this and the lighting elements is conventional.

Figure 4:
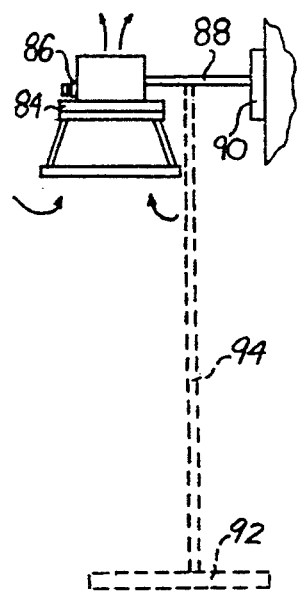
FIG. 4 is a schematic side elevational view of a fixture of the invention having a base mounting system (either on a wall or on a floor)

Smoke removal in smaller areas, such as a room in a house, or areas where the typical smoke level does not require a relatively large smoke removal capacity (e.g., a room with only one or two smokers), may be accomplished by using a smaller or miniaturized air filtering light fixture of the invention of a style illustrated in FIG. 4. A fixture of the invention may be supported or suspended in various ways so as to achieve a spaced relationship from the ceiling and an elevated condition above a floor or above an area that may be occupied by one or more smokers. It may be suspended from the ceiling of the room, as discussed above. Alternatively, housing 84 with access door 86 may be supported by a base mounting system such one that is rigid. For example, a cantilevered or horizontal support arm 88 may extend from the housing 84 to a wall plate 90 fixed to a vertical wall surface of a room. Optionally, the base mounting system may be supported from a floor plate 92, as shown by dashed lines in FIG. 4. This type of support for the fixture provides easy portability. A floor base plate 92 for the stand rests upon the floor (or other horizontal surface) of the room and supports a substantially vertical pole 94 fixed to the base 92. One end of a horizontal arm 88 is mounted on the pole 94 and the opposite end of the arm is mounted to structural means (e.g., a suitable bracket) on a peripheral wall or other suitable portion of the fixture's housing 84. Still other means of supporting the fixture may also be useful.

Figure 5:
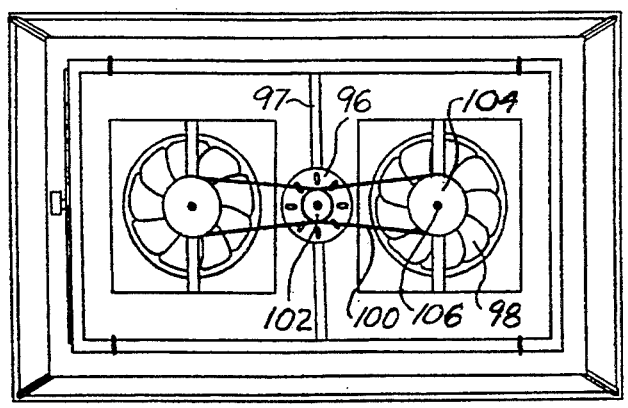
FIG. 5 is a schematic top plan view of a fixture of the invention having a balanced arrangement for a motor driving the rotation of two fan assemblies.

An optional air propulsion means arrangement, as shown in FIG. 5, has a fan motor 96 mounted on brace 97 of the housing. The motor 96 drives the propellers of one or more fan assemblies that are laterally spaced from each other and from the location of motor 96. The means for transmitting power from the motor 96 to the propellers (e.g. propeller 98) of the fan assemblies suitably comprises a flexible belt. For example, belt 100 is entrained on a driver pulley 102 mounted on the shaft of the motor 96 and also entrained on a driven pulley 104 mounted on the central shaft 106 of the propeller 98. Other ways, such as a series of gears may be used to transmit power. A motor shared by at least two fan assemblies may reduce the fixture weight and also the noise generated by the fixture as compared to a fixture with a separate motor dedicated to driving the propeller of each fan assembly. Significantly, the position of the motor and plural fan assemblies can easily be adjusted to achieve a balancing of the weight or center of gravity of the fixture, with concomitant reduction of vibration tendencies. (Since the motor has the greatest potential to be a source of vibration, it is best to locate it in alignment with the vertical axis of the center of gravity.) The benefit of reduced vibration for a single power source or motor comes with the added benefit of the economy that results when a single power source is used. By using a center or central placement for the single motor, as illustrated in FIG. 5, it is easier to maintain a balanced relationship for the elements of the fixture even when the number of fans (and vertical air paths affected by them) are increased beyond a single fan up to 3 or 4 or possibly more. An advantage of the single motor but plural fan design as illustrated in FIG. 5 is that the bulk of the motor is displaced from the vertical air stream or streams and does not serve as an obstruction to a vertical air flow.

A variety of lighting arrangements are useful to enhance the fixture as an attractive object. For example, a neon tube wrap about the fixture or portions of it may be useful in some environments, with or without other brighter lighting systems on the fixture. Different bridge styles for arrangements of bright lights may be employed, as desired.

It is believed that those skilled in the art will readily recognize that this invention may be embodied in still other specific forms than illustrated without departing from the spirit or essential characteristics of it. The illustrated embodiment is therefore to be considered illustrative and not restrictive, the scope of the invention being indicated by the appended claims rather than the foregoing description; and all variations that come within the meaning and range of equivalency of the claims are intended to be embraced thereby.

That which is claimed is:

1. An air filtering fixture for mounting in spaced relationship from the ceiling of a room and in an elevated condition above an area where persons may congregate, comprising:

a housing having peripheral walls comprised of upper compartment walls and lower hood walls below said upper compartment walls, said lower hood walls having a horizontal upper edge, said peripheral walls defining a generally vertical air path for an upwardly moving air stream, said vertical air path being centrally located in said housing, said housing having a horizontal bottom opening defining an air intake mouth and a horizontal top opening defining an air exhaust for directing air upwardly from said housing, said top opening being centrally located vertically above said bottom opening, said upper compartment peripheral walls being generally vertically oriented and said lower hood peripheral walls being slanted in a downward and outward direction from said upper compartment walls to said air intake mouth, said upper compartment peripheral walls having a horizontally oriented access opening therethrough at a location above but proximate to said horizontal upper edge of said lower hood walls, a horizontally oriented air filter removably mounted in the interior of said housing within said upper compartment peripheral walls and extending transversely of said vertical air path for filtering contaminants out of the upwardly moving air stream, said air filter being slidably removable in a horizontal direction through said horizontally oriented access opening, and air propulsion means mounted in said housing above said horizontally oriented air filter and comprising a centrally located motor, two axial flow fan assemblies laterally spaced from said motor, and a belt system for transmitting power from said motor to said axial flow fan assemblies, said motor and said axial flow fan assemblies being in a substantially balanced arrangement in said fixture to minimize the effect of any vibration tendencies on said fixture, said air propulsion means being for pulling air from below said housing upwardly through said air intake mouth and through said air filter and propelling the air as an air stream out of said top opening toward the ceiling so as to thereby form a toroidal air movement about said peripheral walls of said housing, with air within said housing moving upwardly and air laterally external to said housing induced to move downwardly and enter said air intake mouth by virtue of the displacement of air caused by the exhaust air stream above said housing.

2. The fixture of claim 1 additionally comprising light emitting means mounted on said housing for projecting light downwardly therefrom.

3. The fixture of claim 2 wherein said light emitting means is located within said housing and below said air filter.

4. The fixture of claim 1 additionally comprising structural means on said housing for receiving suspension means for mounting said fixture in suspended relationship from the ceiling of a room, 5. The fixture of claim 4 additionally comprising suspension means attached to said structural means on said housing.

6. The fixture of claim 1 additionally comprising structural means on said housing for mounting said fixture by means of a base mounting system.

7. The fixture of claim 1 additionally comprising closure means for said access opening, 8. The fixture of claim 7 wherein said closure means comprises a hinged door.

9. The fixture of claim 1 additionally comprising an air filter support channel mounted in the interior of said housing on said peripheral walls.

10. The fixture of claim 1 wherein said lower hood peripheral walls include light transmitting panels.

11. The fixture of claim 1 additionally comprising a bridge member spaced downwardly from said air filter and extending horizontally across the air path below said filter and light-emitting means mounted on said bridge member.

12. An air filtering light fixture for support in spaced relationship from the ceiling of a room and in an elevated condition above an area where persons may congregate, comprising:

a housing having peripheral walls defining a generally vertical air path for an upwardly moving air stream, said vertical air path being centrally located in said housing, said housing having a horizontal bottom opening defining an air intake mouth and having a lower hood portion comprised of lower hood peripheral walls slanted downwardly and outwardly to said horizontal bottom opening, said housing also having a horizontal top opening defining an air exhaust for directing air upwardly from said housing, said top opening being centrally located vertically above said bottom opening, means on said housing for supporting said housing in a spaced relationship from the ceiling of a room and in an elevated condition above where persons may congregate, a horizontally oriented air filter removably mounted in the interior of said housing at a location above said lower hood portion, said air filter being mounted in a manner such that said filter may be removed in a horizontal direction from said housing through a said peripheral wall at a location above said lower hood portion, said air filter being oriented to extend transversely of said air path for filtering contaminants out of the air stream, a bridge member mounted on said housing at a location spaced downwardly away from said air filter and extending horizontally across said air path between the outwardly slanted lower hood peripheral walls so as to avoid restriction of the air path entrance into said air filter, light emitting means mounted on said bridge member of said housing for projecting light downwardly therefrom, and air propulsion means mounted in said housing above said air filter, said air propulsion means being for pulling air from below said housing upwardly through said air intake mouth and through said air filter and propelling the air as an air stream out of said top opening toward the ceiling so as to thereby form a toroidal air movement about said peripheral walls of said housing, with air within said housing moving upwardly and air laterally external to said housing induced to move downwardly and enter said air intake mouth by virtue of the displacement of air caused by the exhaust air stream above said housing.

13. The fixture of claim 12 wherein said support means comprises a base mounting system.

14. The fixture of claim 13 wherein said base mounting system comprises a wall plate for mounting on a wall of a room.

15. The fixture of claim 13 wherein said base mounting system comprises a floor plate for resting on the floor of a room.

16. The fixture of claim 12 wherein said light emitting means comprises at least two light emitting devices mounted on said bridge member.

17. The fixture of claim 12 wherein said air propulsion means comprises an axial flow fan.

18. The fixture of claim 12 wherein said air propulsion means comprises a motor, at least two laterally spaced axial flow fan assemblies, and means for transmitting power from said motor to said axial flow fan assemblies, said motor being disposed in horizontally spaced relation to said axial flow fan assemblies and said air propulsion means being in a substantially balanced arrangement in said fixture to minimize the effect of any vibration tendencies on said fixture.

19. A method of filtering and recirculating air in a room, comprising:

(a) forming an air filtering fixture comprising:
(i) a housing having peripheral walls defining a generally vertical air path for an upwardly moving air stream, said vertical air path being centrally located in said housing, said housing having a horizontal bottom opening defining an air intake mouth and a horizontal top opening defining an air exhaust for directing air upwardly from said housing, said top opening being centrally located vertically above said bottom opening, said peripheral walls of said housing having an upper portion within which an air propulsion means is adapted to be received and having a horizontally oriented access opening therethrough at a location above said horizontal bottom opening and below said upper portion, (ii) a horizontally oriented air filter removably mounted in the interior of said housing at the location of said horizontally oriented access opening and extending transversely of said vertical air path, said air filter being slidably removable and replaceable in a horizontal direction through said horizontally oriented access opening, and (iii) an axial flow air propulsion means mounted in said housing above said horizontally oriented air filter and within said upper portion of said peripheral walls, (b) providing sloped peripheral walls for said fixture with the slope thereof being such as to extend outwardly and downwardly below said horizontally oriented filter, (c) suspending said air filtering fixture in spaced relationship from the ceiling of a room and in an elevated condition above an area where persons may congregate, and (d) activating said air propulsion means to pull air from below said housing upwardly through said air intake mouth and through said air filter and to propel said air as an air stream out of said top opening toward the ceiling so as to thereby cause the formation of a toroidal air movement about said peripheral walls of said housing, with air within said housing moving upwardly and air laterally external to said housing induced to move downwardly and enter said air intake mouth by virtue of the displacement of air caused by the exhaust air stream above said housing.

* * * * *